(No Model.)
E. J. GRIFFITHS & J. G. MILLER.
CHECK ROW CORN PLANTER.
No. 512,697. Patented Jan. 16, 1894.
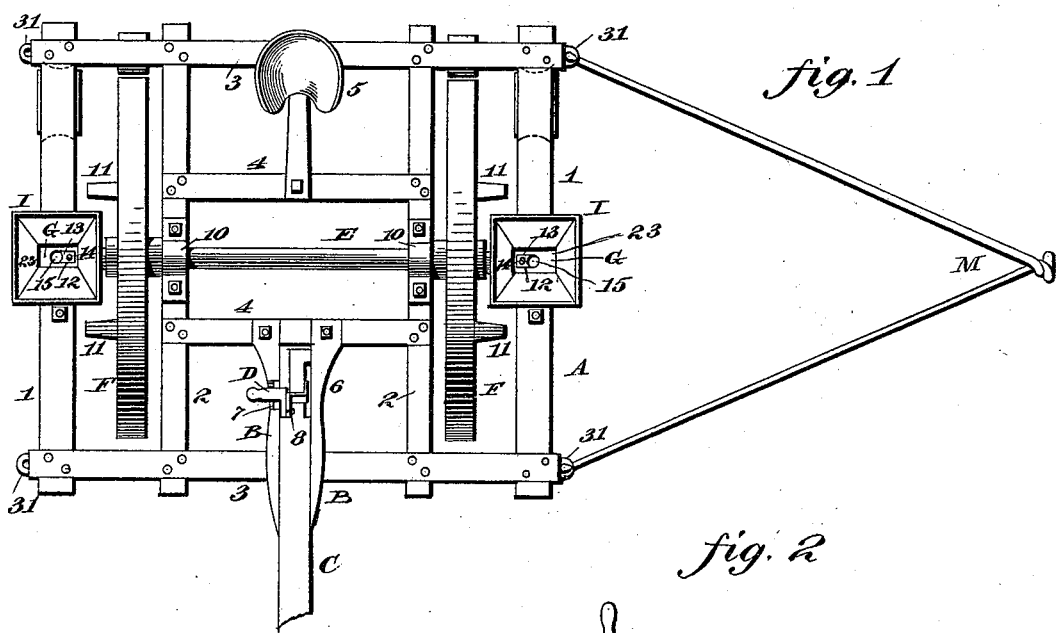
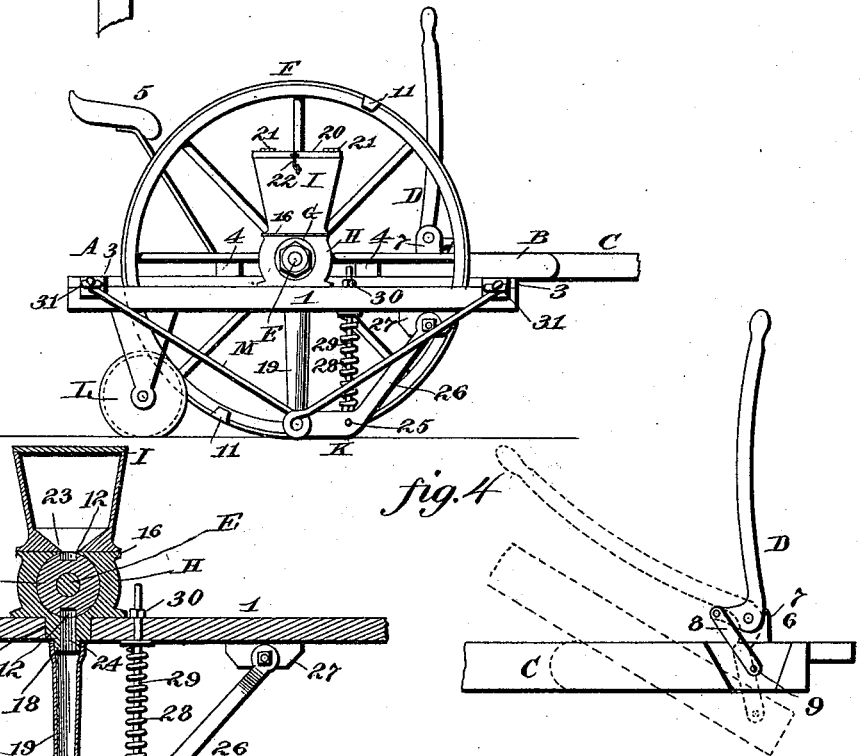
Witnesses.
Inventors
Edward J. Griffiths
Junius G. Miller
By D. C. Fitzgerald
Atty.

United States Patent Office.

EDWARD J. GRIFFITHS AND JUNIUS G. MILLER, OF NEKIMI, WISCONSIN; SAID GRIFFITHS ASSIGNOR TO SAID MILLER.

CHECK-ROW CORN-PLANTER.

SPECIFICATION forming part of Letters Patent No. 512,697, dated January 16, 1894.

Application filed March 8, 1893. Serial No. 465,078. (No model.)

*To all whom it may concern:*

Be it known that we, EDWARD J. GRIFFITHS and JUNIUS G. MILLER, citizens of the United States, residing at Nekimi, in the county of Winnebago, State of Wisconsin, have invented certain new and useful Improvements in Check-Row Corn-Planters; and we do hereby declare the following to be a full, clear, and exact description of the invention, such as will enable others skilled in the art to which it appertains to make and use the same.

Our invention relates to an improvement in check-row corn-planters.

The invention will first be described in connection with the accompanying drawings, and then pointed out in the claims.

In the drawings, Figure 1 is a plan view of our improved check-row corn-planter. Fig. 2 is a side elevation of the same. Fig. 3 is a vertical sectional view showing the grain feeding device. Fig. 4 is a detail view of the tongue-operating device.

Referring to the drawings, A is the framework of the machine, being composed of side-sills 1, middle-sills 2, cross-ties 3, and cross-braces 4, a seat 5 being attached to the rear cross-brace 4, as shown.

B are tongue-shanks, in which a tongue C is pivoted at 6, thus permitting the tongue to be moved in a vertical plane by means of a bell-crank lever D, pivotally attached to a lug 7 bolted to one of the tongue-shanks, the short-end of the bell-crank lever being pivoted to a clevis-band 8 which turns freely on a bolt 9 passing through its ends and through the inner end of the tongue.

E is a shaft or axle journaled on the middle-sills 2 at 10. On this shaft or axle between the side and middle sills, are fixed drive-wheels F provided with spurs 11, as shown. To each end of the shaft is attached a feed-head or cylinder G, cylindrical in form, and provided with slots 12 in which slide feed-adjusters 13 held by screws 14 passing through slots in the feed-adjusters and threaded into the feed-head. The inner end of each feed-adjuster is semicircular, as is also the outer end of each slot 12, thus forming a seed-cavity 15, which, it will be observed, may be increased or diminished by moving the feed-adjuster 13 in or out in its slot.

H are head-casings in which the feed-heads revolve, each casing being provided with a flanged portion 16, a square portion 17, and a tubular projection or extension 18 below the square portion. The square portion is fitted into a square socket cut in the side-sill, and the lower cylindrical portion projects below the bottom of the said sill, a seed-pipe 19 being attached to it in any suitable manner. On the top of the flanged portion 16 of each casing is mounted a seed-hopper I of ordinary construction, preferably provided with a lid 20 hinged at 21 and fastened by a hook and staple as at 22. For the purpose of permitting the grain to pass from the hopper into the seed-cavity 15, an opening 23 is made in the upper flanged portion 16 of the casing, and to permit the seed to fall from the seed-cavity into the seed pipe 19, an opening 24 is made through the bottom of the casing, passing entirely through both the square portion 17 and the cylindrical portion 18. Thus as the feed-head is revolved its seed-cavities will be filled with seed from the hopper and will then move through one-half a revolution and empty the seed into the seed-pipe 19. This seed-pipe opens at the back of a drill-opener K, consisting of a shoe 25 and a pair of arms 26 formed integral with the shoe, these arms being pivoted one on each side of a lug 27 bolted to the under side of the side-sill. To hold the shoe against and, in fact, into the ground, a spring 28 is provided, a rod 29, passing through the center of the spring and pivoted to the forward portion of the shoe, serving to hold the spring in place. To limit the downward movement of the shoe by the spring, the rod 29 is arranged to pass through and above the top of the side-sill and is threaded and provided with a nut 30 whereby the pressure of the spring may be adjusted.

L are covering-wheels, journaled to the side-sills in line with and to the rear of the shoes. These covering-wheels are of the usual construction, being quite broad and concave on the periphery.

Each corner of the frame-work A is provided with staples 31, those on one side forming a pair.

M is a furrow-marker, preferably of light rod-iron, its outer end being twisted and bent downward as shown in order to make a mark on the surface of the ground, the inner ends of the marker being bent upward to form hooks, these ends being adapted to enter either pair of staples 31, according to the side on which it is desired to use the marker.

The operation of our machine is so obvious from what has been stated, as to need no further description.

It will be seen that by shifting the bell-crank lever D the front of the machine may be raised or lowered as desired when the team is hitched to the tongue, and by raising the front of the machine the drive-wheels F will be lifted from the ground and the seed-planting device rendered inoperative, as when going to and from the field. By lowering the front of the machine the whole weight may be thrown on the drive-wheels and shoe, thereby operating the seed-planting mechanism.

The spurs 11 on the drive-wheels serve to mark the point at which the seed will be dropped, so that the driver, if he finds the spurs do not come around in a vertical plane directly over the cross-furrows, may lift the front of the machine and stop the seed-planting mechanism until at the proper point.

Having thus fully described our invention, what we claim, and desire to secure by Letters Patent, is—

1. In a planter, the combination with a frame, of an axle journaled thereon and provided with spurs, said frame being provided with perforated side-sills arranged outside the wheels, a head-casing for each side-sill, each head-casing being provided with a tubular projection, 18, passing through the perforation on its respective side-sill, and with a transverse circular recess arranged concentric with and adapted to receive the ends of the axles, a feed-head mounted on each end of the axle in said recesses, each feed-head provided with oppositely arranged seed-pockets, a hopper mounted on each casing, a seed spout, 19, secured to the projecting lower end of each tubular projection 18, drill openers each consisting of a shoe arranged adjacent to the lower end of its respective seed spout, an arm extending from each shoe and pivoted at their upper ends to the frame, rods 29, pivoted at their lower ends to the said shoes and guides at their upper ends in openings in the side sills, and a spring surrounding each rod and bearing against its respective side-sill, substantially as described.

2. The combination with a planter, of a pair of staples secured on opposite sides of the planter, and an interchangeable V-shaped marker having its inner ends hooked to engage the staples and adapted to be used alternately on either side of the planter and its outer end bent downward to form a marking point, each side of the marker inclining equally from its staple to the marking point, whereby the forward side of the marker forms a tie and the rear side forms a brace, substantially as described and for the purpose set forth.

In testimony whereof we affix our signatures in presence of two witnesses.

EDWARD J. GRIFFITHS.
JUNIUS G. MILLER.

Witnesses:
W. G. GRIFFITHS,
R. B. EVANS.